(12) United States Patent
Carroll (10) Patent No.: US 7,017,118 B1
(45) Date of Patent: Mar. 21, 2006

(54) METHOD AND APPARATUS FOR REORDERING DATA ITEMS

(75) Inventor: Michael E. Carroll, Westford, MA (US)

(73) Assignee: International Business Machines Corp., Armonk, NY (US)

( * ) Notice: Subject to any disclaimer, the term of this patent is extended or adjusted under 35 U.S.C. 154(b) by 331 days.

(21) Appl. No.: 09/752,337

(22) Filed: Dec. 29, 2000

(51) Int. Cl.
G06F 3/00 (2006.01)

(52) U.S. Cl. ............... 715/770; 715/769; 345/160; 345/172

(58) Field of Classification Search ............... 345/764, 345/769, 770, 783, 160, 853, 761, 835; 715/503, 715/769, 770
See application file for complete search history.

(56) References Cited

U.S. PATENT DOCUMENTS 4,839,640 A * 6/1989 Ozer et al. ............ 340/5.33
5,706,449 A * 1/1998 Liu et al. .............. 345/823
5,767,850 A * 6/1998 Ramanathan et al. ....... 345/797
2002/0045887 A1 * 4/2002 DeHoogh et al. .......... 606/1

* cited by examiner

Primary Examiner—Kieu D. Vu
(74) Attorney, Agent, or Firm—Kudirka & Jobse, LLP (57) ABSTRACT

A swapping utility enables directional commands from a graphic user interface and/or keyboard to be utilized to swap data items associated with lists, tables or other series of data items. Upon receipt of both a directional command, e.g. up, down, left, or right, and a swap command, the utility uses the current position of the cursor or a selected entity to identify a first data item to be swapped and the relative direction thereto to identify a second, adjacent data item to be swapped. If both identified data items are of the same data type, their respective contents are exchanged within the ordered list or table without the need to cut and paste the content. In alternative embodiments, multiple adjacent data items may be swapped, or, in an embodiment which utilizes multiple selection icons, single or multiple nonadjacent entities may be directly swapped.

3 Claims, 9 Drawing Sheets

METHOD AND APPARATUS FOR REORDERING DATA ITEMS

FIELD OF THE INVENTION

This invention relates, generally, to data processing systems and, more specifically, to a technique for reordering lists using user interface directional controls.

BACKGROUND OF THE INVENTION

Current data processing systems enable users to modify or edit series of items, such as lists, table cells, text, etc. Such modifications typically occur through deletions and replacement, e.g., "cutting and pasting" data items. This process is somewhat convenient particularly where the data or items to be modified or swapped are not adjacent. When composing or editing lists of items, such as bulleted or numbered lists, the same technique is utilized. This is not convenient if a large number of modifications comprise swapping of adjacent items. That is, a large number of "cuts and pastes" are required to reorder the list. Certain word processing software applications allow insertion of items into an existing list with the remaining items be reordered and/or renumbered accordingly. However, where existing adjacent data items are to be swapped there are no convenient shortcuts other than copying and inserting.

The alpha numeric keyboards which are used to interact with the central processing unit of most computer systems include directional controls for movement of a cursor or, as with earlier operating systems, selection of menu items from a graphic user interface display. These directional controls include up, down, left, and right arrows which move the cursor or selection in their respective direction relative to a current position. Such directional controls, however, typically are not utilized by current software applications to actually manipulate data beyond cursor navigation or menu selection.

Accordingly, a need exists for a technique in which the directional controls i.e., the up arrow, down arrow, left arrow, and right arrow, on an alpha numeric keyboard can be utilized to swap the content of either adjacent or non-adjacent data types.

SUMMARY OF THE INVENTION

The present invention provides a method, apparatus, and computer program product for use with a computer system which enables the directional controls from a graphic user interface and/or keyboard to be utilized to swap data items associated with lists, tables or other series of data items. Specifically, a swap utility which may be integrated into an application or the operating system receives both a directional command, e.g. up, down, left, or right, and a swap command, such as a function or control key. The swap utility utilizes the current position of the cursor or a selected entity to identify the first data item to be swapped. The swap utility the uses the current position of the first data item and the relative directional command to identify a second, adjacent data item to be swapped. Such process may be easily determined if the first and second data items are represented in memory as a linked list. The swap utility then determines if both identified data items are of the same data type. If so, the swap utility exchanges the respective content of the data items within the ordered list or table without the need to cut and paste the content.

For example, assuming the cursor position identifies the second data item of a numbered list of data items, upon activation of the up directional key and a predefined swap key, the contents of the second data item will be swapped with the contents of the first data item in the numbered list. The actual number of the list will not change, only the content associated with the respective numbers. Alternatively, if in the above example, the down directional key had been activated, the contents of the second data item would be swapped with the third data item in the numbered list. Successive swapping of adjacent data items may be used to effect exchange of data items which were originally nonadjacent, allowing the, in the above example, the content originally associated with the first data item to be moved downward in the ordered list with a series of successive down directional commands and swap commands. For two-dimensional entities, such as a table of cells, data items may be swapped with left and right adjacent data items using the respective left and right directional commands in a similar manner.

In an alternative embodiment of the invention, particularly useful with tables, multiple data items, such as all or part of a row or column of cells may be swapped with a like number of adjacent cells. In this embodiment, the swap utility functions similarly except that multiple data items are selected at the time the directional and swap commands are received.

In yet another alternative embodiment of the invention, more than one selection icons, such as a marker/cursor may be utilized to select and directly swap nonadjacent data items. In such embodiment, a "marker", usually a prior cursor position, identifies first data item(s) and the live position of the cursor identifies the second data item(s). Upon receipt of the swap command the content associated with the data items will be exchanged. This embodiment can be combined with any of the previously described embodiments so that, for example, multiple sets of nonadjacent data items may be swapped.

In accordance with a first aspect of the invention, a method for use with a computer system having a user interface capable of displaying a plurality of data items and receiving user commands comprises: (a) receiving, through the user interface, a command to swap a first displayed data item with a second displayed data item; (b) obtaining data identifying the first displayed data item; (c) determining the identity of the second displayed data item; and (d) swapping the first displayed data item with the second displayed data item.

In accordance with a second aspect of the invention, an alternative method comprises: (a) receiving data defining a position of a first selection icon relative to a first plurality of displayed data items; (b) receiving data defining a position of a second plurality of displayed data items; (c) receiving, through the user interface, one or more commands to swap the first plurality of displayed data items with the second plurality of displayed data items; and (d) swapping the first plurality of displayed data items with the second plurality of displayed data items.

In accordance with a third aspect of the invention, a computer program product for use with a computer system having a user interface capable of displaying a plurality of data items and receiving user commands includes program code comprising: (A) program code for receiving, through the user interface, a command to swap a first displayed data item with a second displayed data item; (B) program code for obtaining data identifying the first displayed data item; (C) program code for determining the identity of the second displayed data item; and (D) program code for swapping the first displayed data item with the second displayed data item.

In accordance with a fourth aspect of the invention, an alternative computer program product for use with a computer system having a user interface capable of displaying a plurality of data items and receiving user commands includes program code comprising: (A) program code for receiving, through the user interface, a command to swap a first plurality of displayed data items with a second plurality of displayed data item; (B) program code for obtaining data identifying the first plurality of displayed data items; (C) program code for determining the identity of the second plurality of displayed data items; and (D) program code for swapping the first plurality of displayed data items with the second plurality of displayed data items.

In accordance with a fifth aspect of the invention, an apparatus for use with a computer system having a user interface capable of displaying a plurality of data items and receiving user commands comprises: (A) program logic configured to receive, through the user interface, a command to swap a first displayed data item with a second displayed data item; (B) program logic configured to obtain data identifying the first displayed data item; (C) program logic configured to determine the identity of the second displayed data item; and (D) program logic configured to swap the first displayed data item with the second displayed data item.

In accordance with a sixth aspect of the invention, an apparatus for use with a computer system having a user interface capable of displaying a plurality of data items and receiving user commands comprises: (A) program logic configured to receive, through the user interface, a command to swap a first plurality of displayed data items with a second plurality of displayed data item; (B) program logic configured to identify the first plurality of displayed data items; (C) program logic configured to determine the identity of the second plurality of displayed data items; and (D) program logic configured to swap the first plurality of displayed data items with the second plurality of displayed data items.

BRIEF DESCRIPTION OF THE DRAWINGS

The above and further advantages of the invention may be better understood by referring to the following description in conjunction with the accompanying drawings in which.

DETAILED DESCRIPTION

Figure 1:
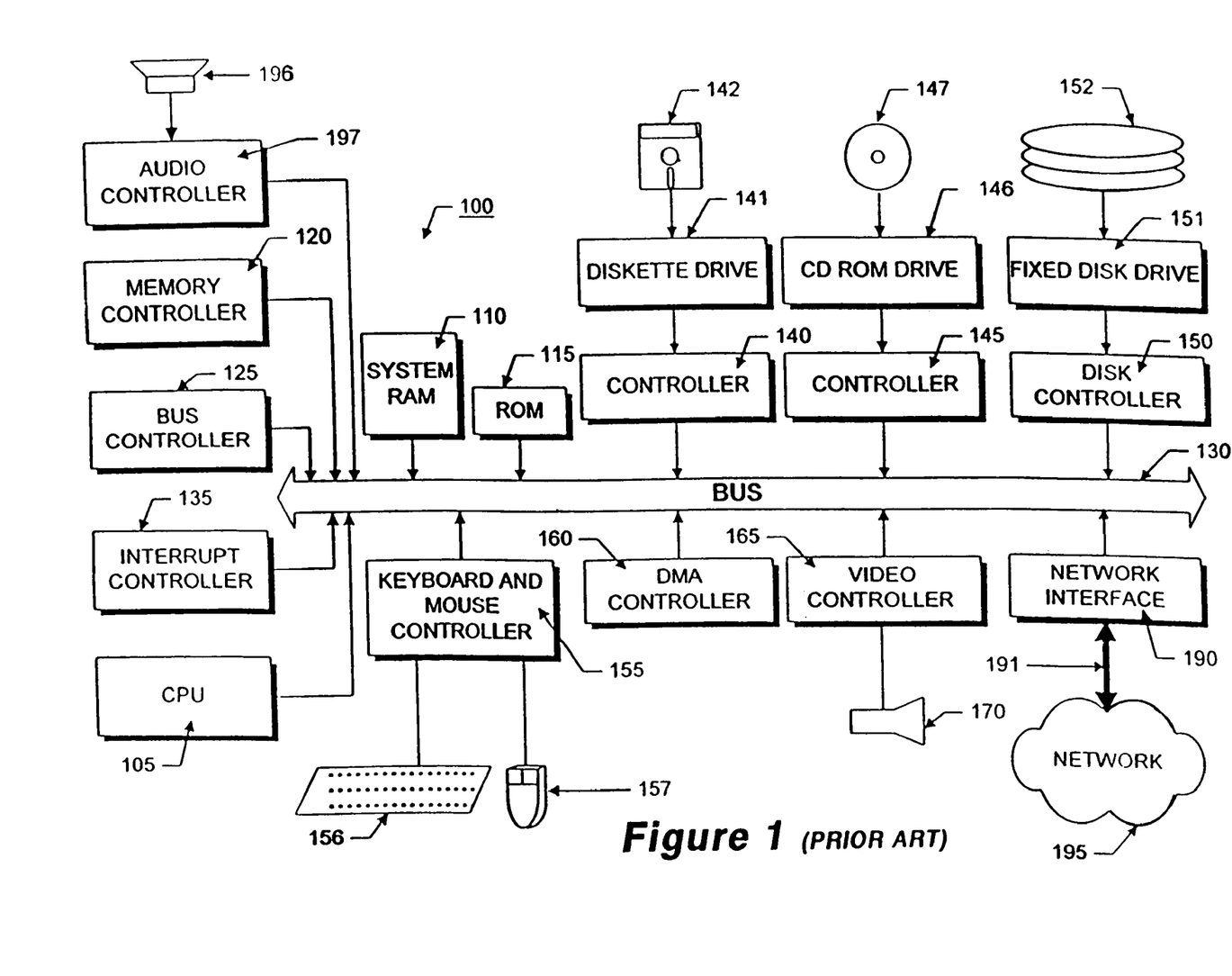
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic use interface presented thereon by an application or the operating system, in addition to or in combination with any keyboard, pointing device, joystick, voice recognition system, speakers, microphone or any other mechanism through which the user may interact with the computer system.

Computer system 100 also includes a communications adapter 190 which allows the system to be interconnected to a local area network (LAN) or a wide area network (WAN), schematically illustrated by bus 191 and network 195.

Figure 2:
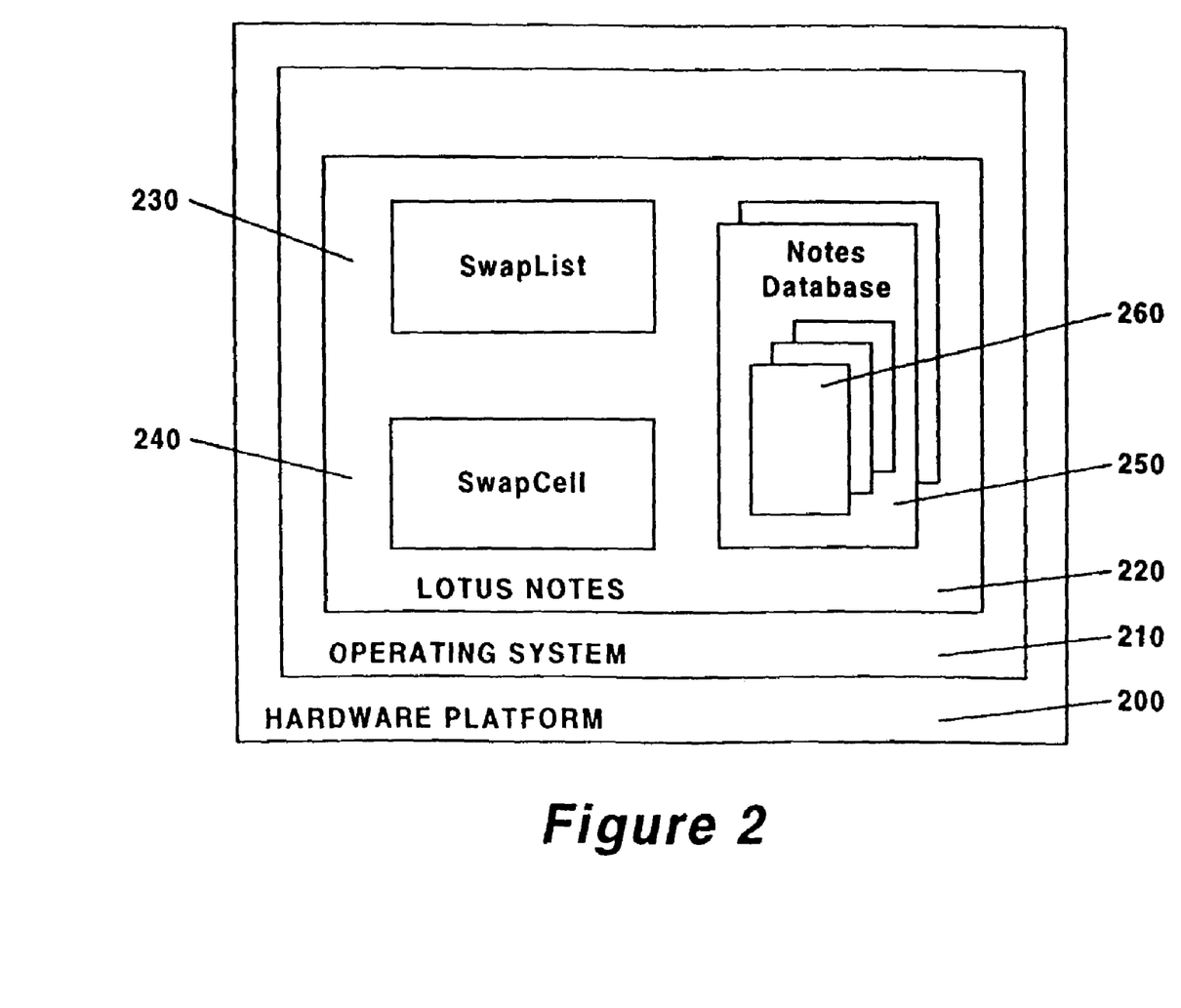
FIG. 2 is a illustrates conceptually the relationship between the components of the system in which the present invention may be utilized.

Computer system 100 is generally controlled and coordinated by operating system software, such the OS/2® operating system, available from International Business Machines Corporation, Armonk, N.Y., or Windows® operating system, available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including AIX, UNIX and LINUX, DOS, etc. One or more applications 220 such as Lotus Notes or Lotus Sametime, both commercially available from Lotus Development Corp., Cambridge, Mass. may execute under control of the operating system. If operating system 210 is a true multi-tasking operating system, multiple applications may execute simultaneously.

In the illustrative embodiment, the present invention may be implemented using object-oriented technology and an operating system which supports execution of object-oriented programs. For example, the inventive code module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

FIG. 2 is illustrates conceptually the relationship between the components of the system in which the present invention may be utilized. The illustrative embodiment of the invention is implemented as part of Lotus Notes®, commercially available from Lotus Development corporation, Cambridge Mass., however it will be understood by those reasonably skilled in the arts that the inventive functionality may be integrated into other applications as well as the computer operating system. To implement the primary functionality of the present invention, two routines or modules, referred to hereafter as Swaplist and SwapCell are implemented within the Lotus Notes application and interact with the existing functionality, routines or commands of Lotus Notes, many of which are publicly available.

As shown in FIG. 2 SwapList module 230 and SwapCell module 240 are integrated into Lotus Notes application 220, which may be Release 5 or higher. Application 220 executes under the control of operating system 210 which in turn executes within the hardware parameters of hardware platform 200, which may be similar to that described with reference to FIG. 1. SwapList module 230 and SwapCell module 240 interact with Notes documents contained within one or more Notes databases 260. The functionality of Swaplist module 230 and SwapCell module 240 are described below.

SwapList

To implement the primary functionality of the present invention, a routine or utility module, designated hereafter as "SwapList" may be implemented to interact with the appropriate Notes commands or procedure calls. Alternatively, SwapList may be designed as part of the operating system or may be integrated partially or entirely into another specific application executable by the operating system. SwapList may be written in the C++ programming language.

In the illustrative embodiment, the SwapList receives both a directional command, e.g. up, down, left, or right, and a modifier, such as a function or control key, which acts as a swap command. Thereafter the SwapList utility obtains the current position of the cursor or a selected entity from a Notes procedure call and uses this data to identify the first data item to be swapped. In the event that the data items are part of an ordered list, the list may be represented in memory as a linked list. The SwapList utility then uses the identity of the first data item and the relative directional value of the received directional command to identify a second, adjacent data item to be swapped. Such process may be easily determined if the first and second data items are represented in memory as a linked list. The SwapList utility then determines if both identified data items are of the same data type. If so, the respective contents of the identified data items are swapped or exchanged by SwapList both in memory and as displayed, within the ordered list or table, without the need for the user to cut and paste the content.

Figure 3A:
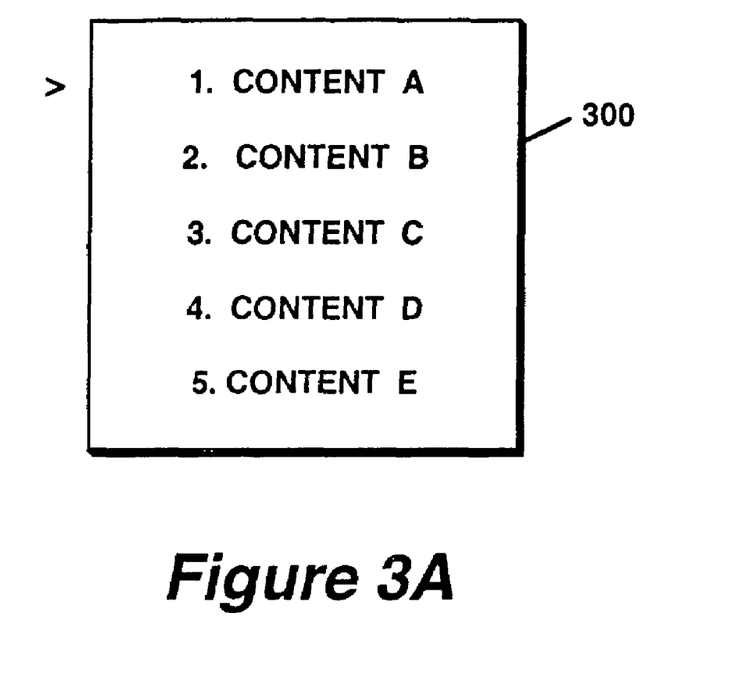
FIG. 3A is a graphic illustration of data items prior to swapping in accordance with the present invention.
Figure 3B:
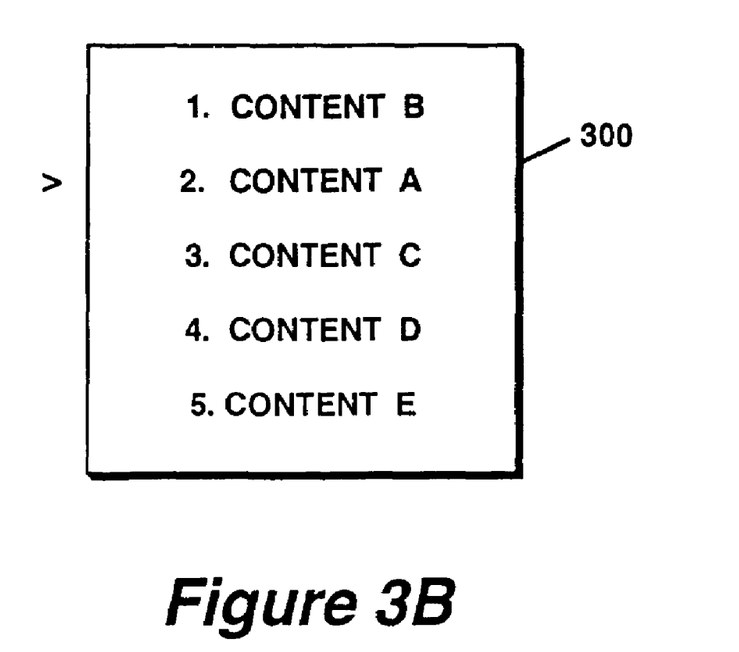
FIG. 3B is a graphic illustration of data items of FIG. 3A after swapping in accordance with the present invention.

As an example, an ordered list 300 of five displayed Data Items 1–5 may have a format as set forth in FIG. 3A. In FIG. 3A, the Data Item 1 of the ordered list 300 is associated with Content A, the Data Item 2 of the ordered list is associated with Content B, the Data Item 3 of the ordered list is associated with Content C, etc. The user places the cursor, designated with a carrot symbol, next to Data Item 1. Thereafter, by simultaneously depressing the "down" arrow on the keyboard and another designated key, such as one of the function keys F1–F12, or, alternatively, by selecting a Swap menu item from the graphic user interface, the SwapList utility will cause the contents of Data Items 1 and 2 to be swapped, resulting in the list ordering as set forth in FIG. 3B. As illustrated in FIG. 3B, Content B is now associated with Item 1 of list 300, while content A is associated with Item 2. In this manner, the contents of the two data items are interchanged or swapped without requiring any "cutting or pasting" of data by the user. In the illustrative embodiment, Content A through Content E of list 300 may be paragraphs. As such, the whole paragraph will be swapped at one time. The data type of the content associated with each item may be defined as an attribute of an object class or database. Note that successive entry of the Swap command and the down directional command will cause the Content A to be swapped with the lower adjacent data item, effectively causing Content A to move sequentially lower in the list until associated with Item 5.

Figure 3C:
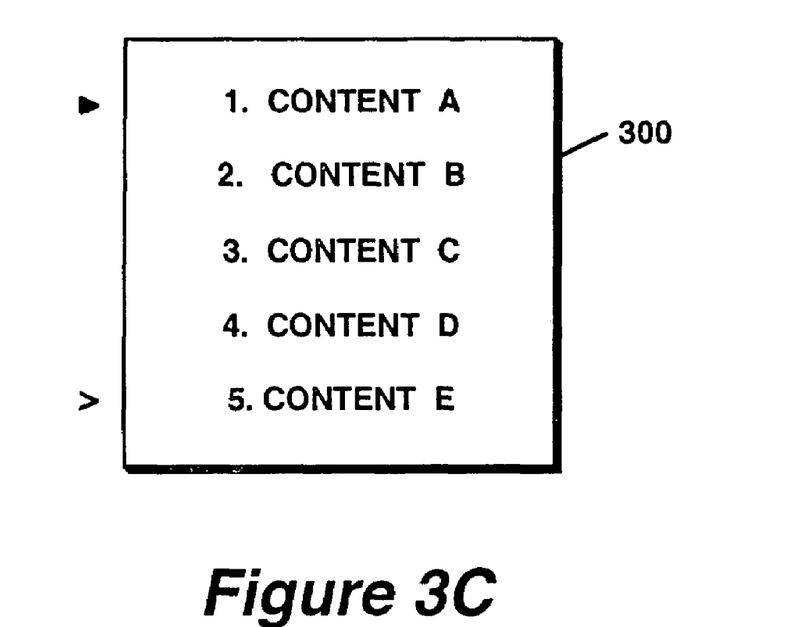
FIG. 3C is a graphic illustration of data items prior to swapping in accordance with an alternative embodiment of the present invention.
Figure 3D:
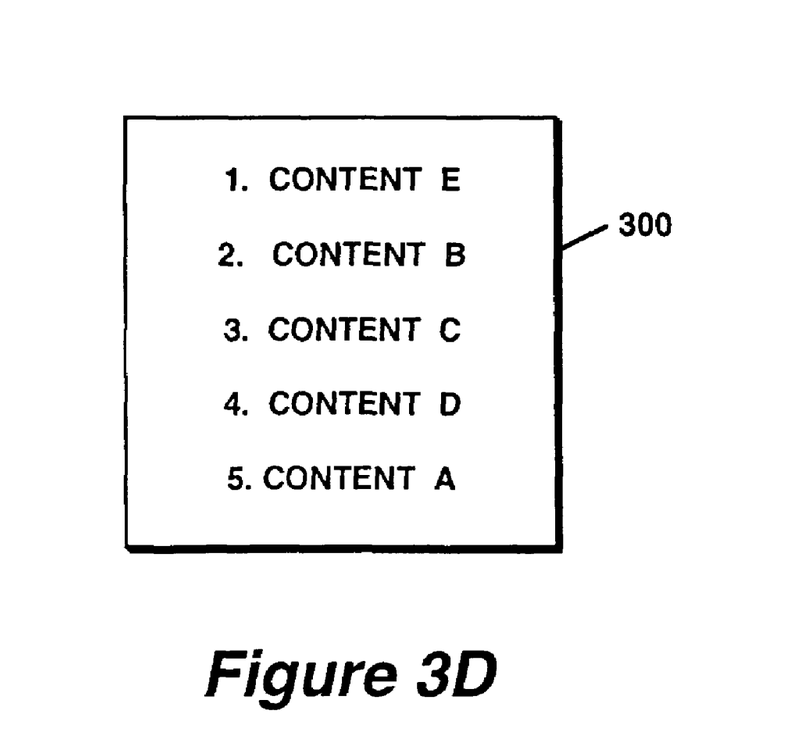
FIG. 3D is a graphic illustration of data items of FIG. 3C after swapping in accordance with an alternative embodiment of the present invention.

In an alternative embodiment, rather than using the up, down, left, or right direction commands associated with either the keyboard or the graphic user interface, a second selection icon or graphic may be used to swap nonadjacent data items. Such second selection icon may be implemented with a second cursor or a single cursor capable of association with multiple data items. Applications which utilize a "marker", essentially previously selected item(s) and the current or "live" positions of the cursor are known in the art and can be utilized to select data items in a list or table which are not adjacent. Utilizing the same list 300 in FIG. 3C, if a marker, designated as a dark carrot, is associated with Data Item 1, Content A, and the current "live" position of the cursor is associated with Data Item 5, Content E, then upon receiving a swap command from the user in any of the manners described above, the contents associated with Data Items 1 and 5 would be swapped. As illustrated in FIG. 3D, Content A is now associated with Data Item 5 of list 300, while content E is associated with Data Item 1. In this manner, nonadjacent data items may be swapped in an efficient manner without requiring "cutting and pasting" of data to the clipboard memory associated with the operating system.

It is contemplated in the present invention that the "swapping" of data involves rewriting of data content in both memory as well as rerendering or displaying the data on the graphic user interface. The ordered list of data items may be represented as linked lists or doubly linked lists in memory. It will be obvious to those reasonably skilled in the arts how such swapping operations occur given the data structure of linked lists. Likewise, if the data items comprise "cells" of a table, the cells may likewise be implemented as linked lists, with a linked list representing the horizontal rows of the table and a linked list representing the vertical rows of the table.

Figure 4:
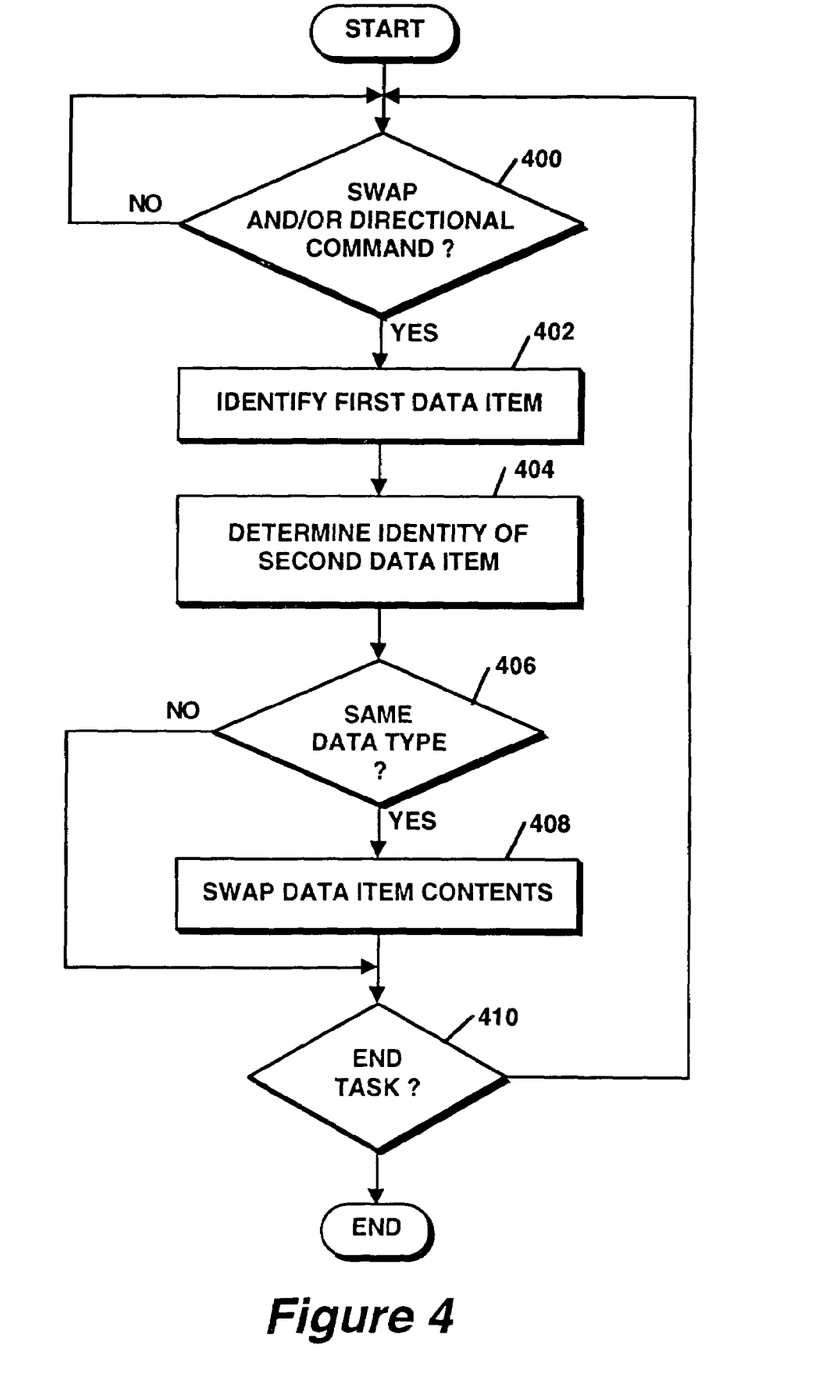
FIG. 4 is a flow chart illustrating the process steps performed by the selection primitive utility of the present invention.

FIG. 4 illustrates the process steps performed by the SwapList utility to achieve the above-described functionality. First, SwapList determines whether a directional command with a modifier, i.e. a swap command, has been received through either the keyboard device driver or the graphic user interface device driver, as illustrated by decisional step 400. As set forth previously, the swap command can be entered through one of the function keys F1–F12, or, alternatively, by selecting a Swap menu item from the graphic user interface. If a swap command has been received, SwapList obtains the coordinates of the selection icon, e.g. the graphic user interface cursor or other graphic element. In this embodiment, Lotus Notes provides the positional data of the cursor to the SwapList utility. These coordinates are resolved by the SwapList utility, in a manner understood by those skilled in the art, to the data item of the ordered list and its respective content. Alternatively, Notes can provide the identity of the data item directly to SwapList. This process is illustrated by step 402 and identifies the first displayed data item.

Next, the identify of the second displayed data item is determined from either a directional command or the current position of the selection icon, depending on whether a marker/cursor implementation is utilized. If a directional command is utilized, SwapList determines which directional command has been specified, and utilizing the identity of the first data item, identifies the adjacent data item. In the event the list is stored in memory as a doubly linked list, SwapList resolves the pointer or object pointer to the adjacent item in the linked list to identify the data item and its associated content. Otherwise, the second data item may be identified in manners similar to those described above. This process is illustrated by step 404 and identifies the second displayed data item.

Next, SwapList checks the data types of the identified data items to determine if they are similar. Such determination may be based on a data type attribute associated with each data item. In such instance, SwapList checks such attribute and determines if the data items have the same data type, as illustrated by step 406. If so, the content associated with each data item will be swapped in memory and redisplayed through the user interface, as illustrated by step 408. Thereafter, if Notes is terminated, the process ends, as illustrated by decisional step 410, otherwise the process returns to step 400 and remains idle until a swap command is again received. Alternatively, the new position of the recently swapped first data item may be set by default as the first data item for a new, potential swap operation.

SwapCell

In the illustrative embodiment, SwapCell may be implemented similar to SwapList with several distinctions. SwapCell is intended for use with data item which may have left and right adjacent data items, such as cells in a table. As such SwapCell may include logic and/or code to traverse pairs of doubly linked lists to determine which adjacent data item a directional command is referencing. In addition, SwapCell may include logic and/or code to recognize groups of selected items and as well as code to swap the contents with either adjacent or nonadjacent groups. Such additional functionality being within the scope of those skilled in the arts given the flow chart of FIG. 4 and the disclosure contained herein. Several examples of the potential implementation of the SwapCell functionality are described below with reference to FIGS. 5A–D and FIGS. 6A–D.

Figure 5A:
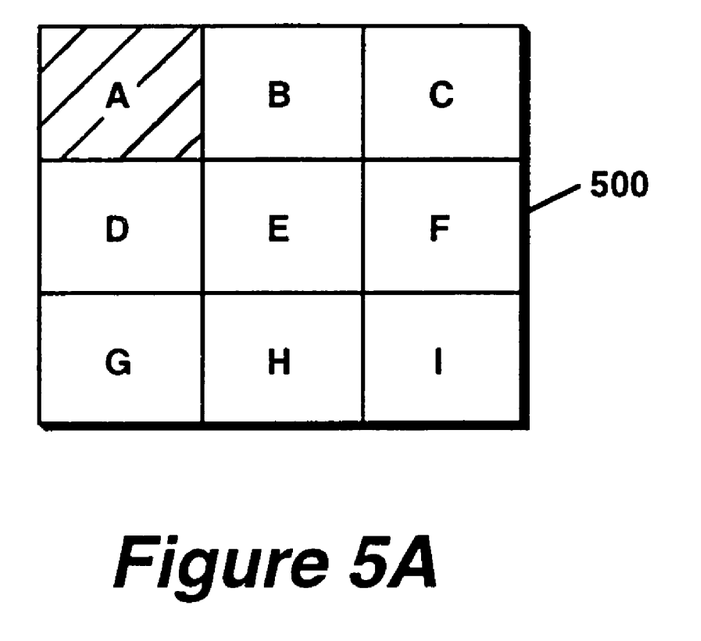
FIG. 5A is a graphic illustration of data items prior to swapping in accordance with the present invention.
Figure 5B:
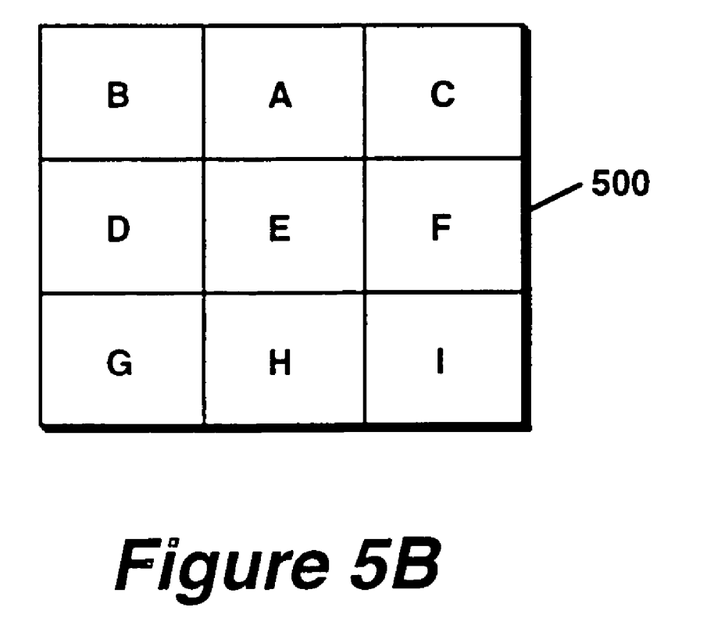
FIG. 5B is a graphic illustration of data items of FIG. 5A after swapping in accordance with the present invention.
Figure 5C:
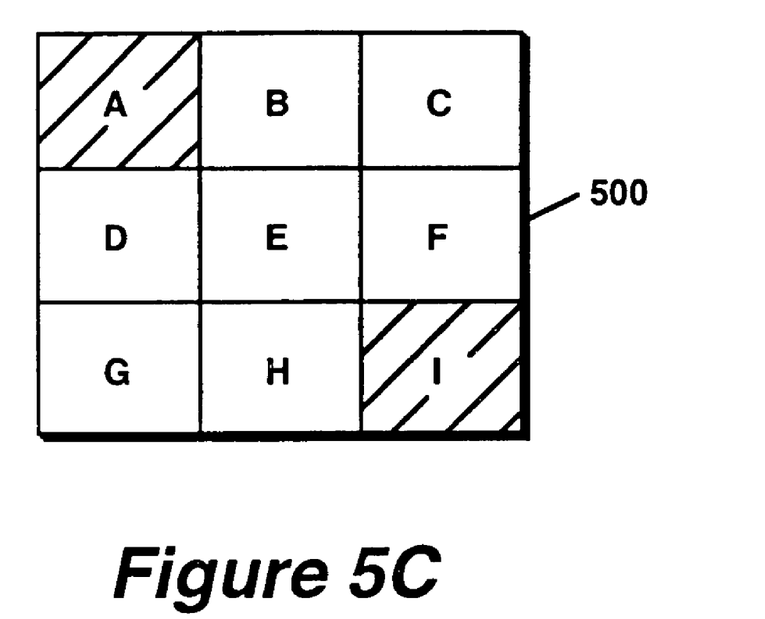
FIG. 5C is a graphic illustration of data items prior to swapping in accordance with an alternative embodiment of the present invention.

An ordered list of nine displayed Data Items may have a format as set forth in FIG. 5A. In FIG. 5A, Data Item 1 of table 500 is associated with Content A, Data Item 2 of table 500 is associated with Content B, Data Item 3 of table 500 is associated with Content C, etc., as illustrated. In one embodiment, the user selects Data Item 1 using the selection functionality of the Notes user interface, e.g. the ability to select one or more cells in a table. Such selection is designated in FIG. 5A with darker shading of Data Item 1. Thereafter, by simultaneously depressing the "right" directional arrow on the keyboard and another designated key, such as one of the function keys F1–F12, or, alternatively, by selecting a Swap menu item from the graphic user interface, the SwapCell utility will cause the contents of Data Item 1 and Data Item 2 to be swapped, resulting in the table ordering as set forth in FIG. 5B. As illustrated in FIG. 5B, Content B is now associated with Data Item 1 of table 500, while Content A is associated with Data Item 2. In this manner, the content of the two data items is interchanged or swapped without requiring any "cutting or pasting" of data by the user. In the illustrative embodiment, Content A through Content I of table 500 may be cells. As with an ordered list, successive entry of the Swap command and the right directional command will cause the Content A to be swapped with the rightmost adjacent cell, effectively causing Content A to move sequentially right in the table until associated with Data Item 9 at the lower right corner of the table 500.

Figure 5D:
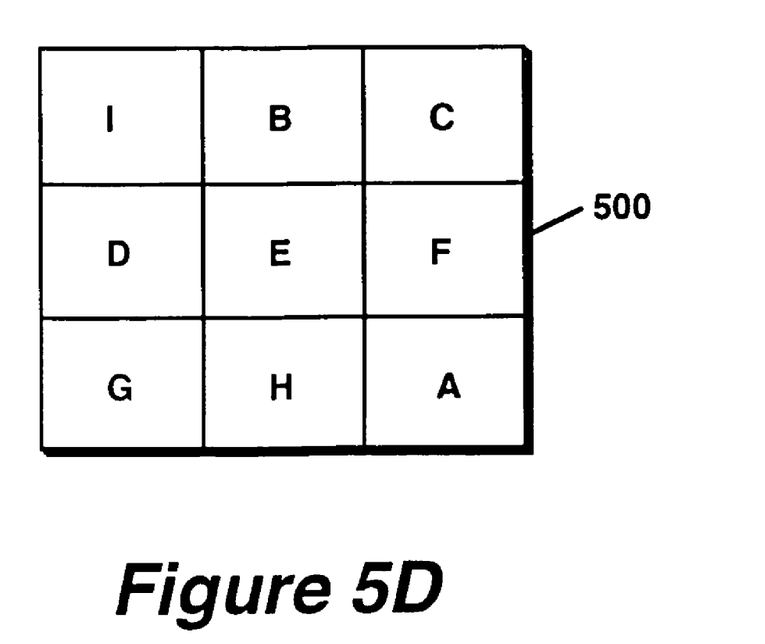
FIG. 5D is a graphic illustration of data items of FIG. 5C after swapping in accordance with an alternative embodiment of the present invention.

In an alternative embodiment, rather than using the up, down, left, or right direction commands associated with either the keyboard or the graphic user interface, a second selection icon or graphic may be used to swap nonadjacent data items, as similarly described with reference to SwapList. Utilizing the same table 500 in FIGS. 5C–D, if a marker, designated with darker shading, is associated with Data Item 1, Content A, and the current "live" position of the cursor is associated with Data Item 5, Content E, also designated with darker shading, then upon receiving a swap command from the user in any of the manners described above, the contents associated with Data Items 1 and 9 would be swapped. As illustrated in FIG. 5D, Content A is now associated with Data Item 9 of table 500, while content I is associated with Data Item 1. In this manner, nonadjacent data items may be swapped in an efficient manner without requiring "cutting and pasting" of data to the clipboard memory associated with the operating system.

Figure 6A:
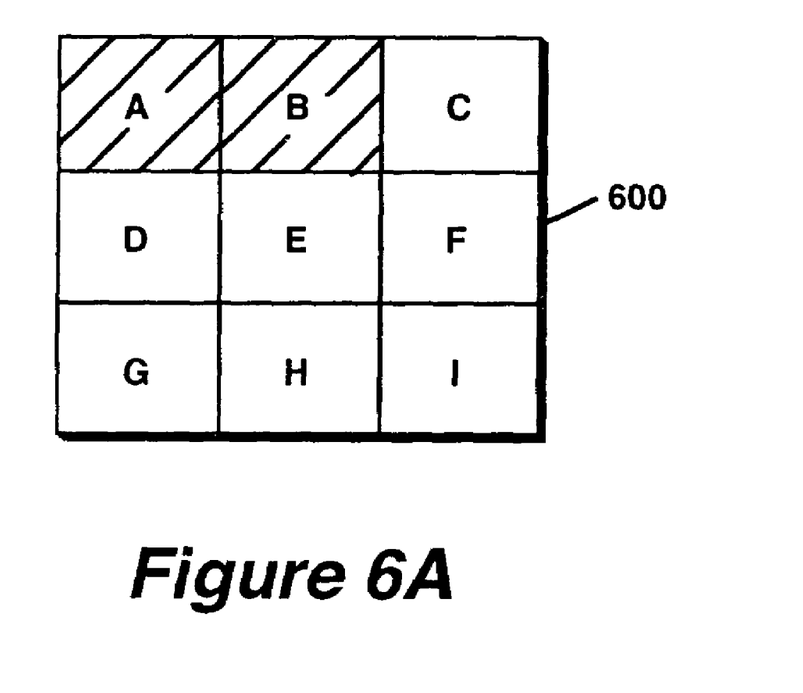
FIG. 6A is a graphic illustration of data items prior to swapping in accordance with the present invention.
Figure 6B:
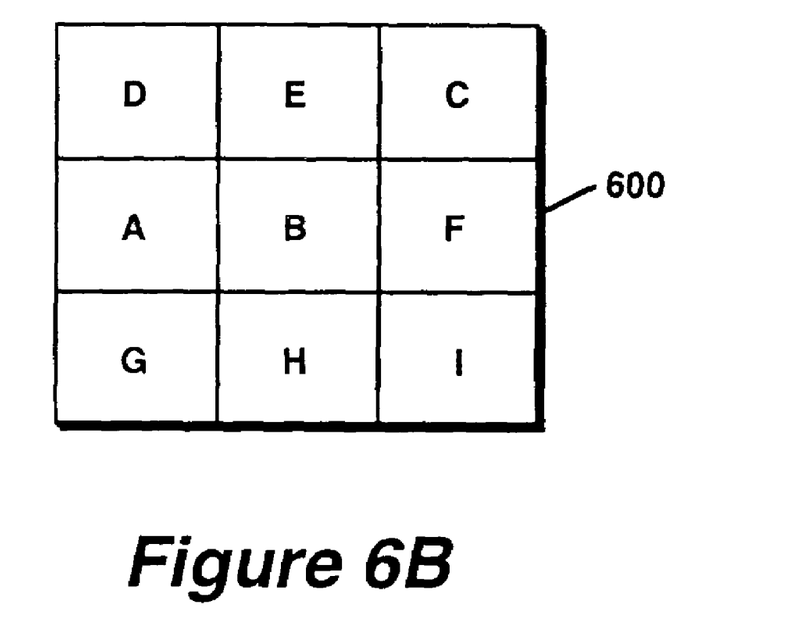
FIG. 6B is a graphic illustration of data items of FIG. 6A after swapping in accordance with the present invention.

In an alternative embodiment, the previously described selection techniques may be used to designate and swap groups of cells in a table. For example using SwapCell a pair of marker/cursors may be used to designate a swap between a group of displayed data items in a table and the adjacent data items in the table. Referring to FIG. 6A, a table of nine displayed Data Items may have a format similar to that set forth in FIG. 5A. In such embodiment, the user selects Data Item 1 and Data Item 2 using the selection functionality of the Notes user interface. Such selection is designated in FIG. 6A with darker shading of Data Items 1 and 2. Thereafter, by simultaneously depressing the "down" directional arrow on the keyboard and another designated key, such as one of the function keys F1–F12, or, alternatively, by selecting a Swap command menu item from the graphic user interface, the SwapCell utility will cause the contents of Data Item 1 and Data Item 2 to be swapped with Data Item 4 and Data Item 5, respectively, resulting in the table ordering as set forth in FIG. 6B. As illustrated in FIG. 6B, Content A is now associated with Data Item 4, while Content B is associated with Data Item 5. Similarly, Content D is now associated with Data Item 1, while Content E is associated with Data Item 2.

Figure 6C:
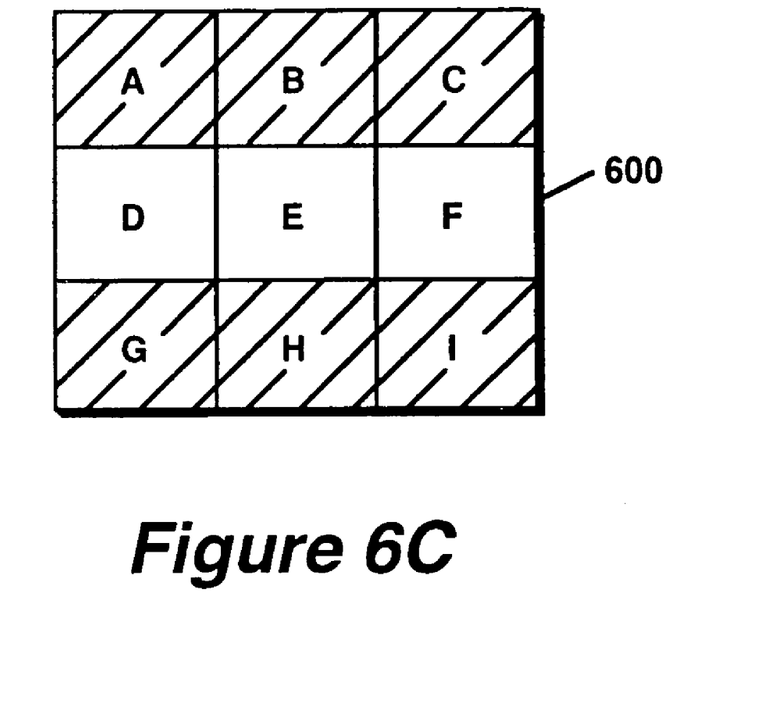
FIG. 6C is a graphic illustration of data items prior to swapping in accordance with an alternative embodiment of the present invention.
Figure 6D:
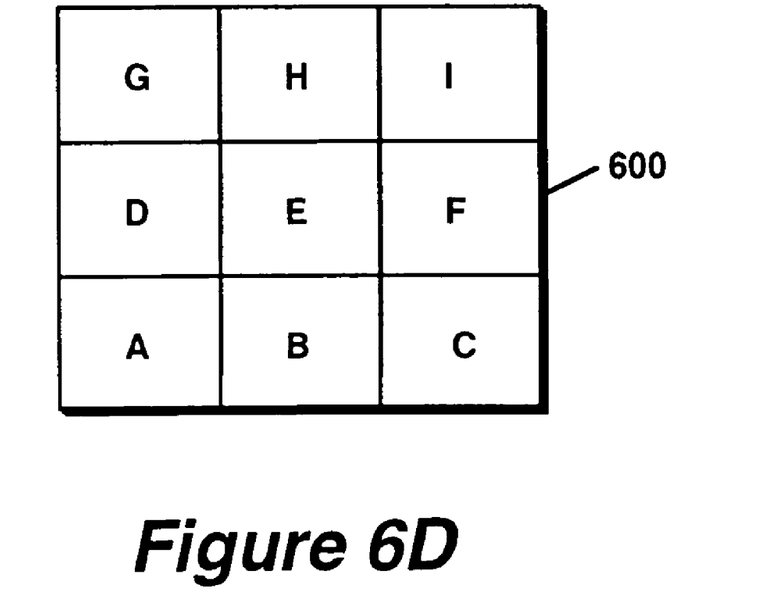
FIG. 6D is a graphic illustration of data items of FIG. 6C after swapping in accordance with an alternative embodiment of the present invention.

In yet another alternative embodiment, rather than direction commands, a second selection icon or graphic may be used to select and swap groups of nonadjacent data items. Such second selection icon may be implemented with a second cursor or a single cursor capable of association with multiple nonadjacent data items. Referring to FIG. 6C, an ordered list of nine displayed Data Items may have a format similar to that set forth in FIG. 6A. In such embodiment, the user selects Data Items 1–3 using the selection functionality of the Notes user interface. Such selection is designated in FIG. 6C with darker shading of Data Items 1–3. If the user subsequently designates Data Items 7–9, then upon receiving a swap command from the user in any of the manners described above, the contents associated with Data Items 1–3 would be swapped with Data Items 7–9, respectively by the SwapCell utility. As illustrated in FIG. 6D, Contents A–C are now associated with Data Items 7–9, respectively, while Contents G–I are associated with Data Items 1–3, respectively. In this manner, nonadjacent groups of data items may be swapped in an efficient manner without requiring "cutting and pasting" of data to the clipboard memory associated with the operating system.

Given the disclosure set forth herein, it is within the scope of those skilled in the arts to appreciate how the invention disclosed herein may also be used with series of delimited data items such as words separated by commas or other elements, to enable swapping of adjacent or non-adjacent data items or groups of data items.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from Lotus Development Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a computer system having a user interface capable of displaying a plurality of data items and receiving user commands, a method comprising:
    (a) receiving, through the user interface, a command to swap a first displayed data item with a second displayed data item;
    (b) obtaining data identifying the first displayed data item;
    (c) receiving, through the user interface, a directional command identifying a relative direction of a position of the second displayed data item to a position of the first displayed data item; and
    (d) swapping the first displayed data item with the second displayed data item.

2. A computer program product for use with a computer system having a user interface capable of displaying a plurality of data items and receiving user commands, the computer program product comprising a computer useable medium having embodied therein program code comprising:
    (A) program code for receiving, through the user interface, a command to swap a first displayed data item with a second displayed data item;
    (B) program code for obtaining data identifying the first displayed data item.
    (C) program code for receiving, through the user interface, a directional command identifying a relative direction of a position of the second displayed data item to a position of the first displayed data item; and
    (D) program code for swapping the first displayed data item with the second displayed data item.

3. An apparatus for use with a computer system having a user interface capable of displaying a plurality of data items and receiving user commands, the apparatus comprising:
    (A) program logic configured to receive, through the user interface, command to swap a first displayed data item with a second displayed data item;
    (B) program logic configured to obtain data identifying the first displayed data;
    (C]) program logic configured to receive, through the user interface, a directional command identifying a relative direction of a position of the second displayed data item to a position of the first displayed data item; and
    (D) program logic configured to swap the first displayed data item with the second displayed data item.

* * * * *

UNITED STATES PATENT AND TRADEMARK OFFICE
CERTIFICATE OF CORRECTION

PATENT NO. : 7,017,118 B1
APPLICATION NO. : 09/752337
DATED : March 21, 2006
INVENTOR(S) : Michael E. Carroll It is certified that error appears in the above-identified patent and that said Letters Patent is hereby corrected as shown below:

<u>Column 11,</u>
Line 10, delete claim 1 in its entirety, and substitute the following in its place:
--1. In a computer system having a keyboard and a user interface capable of displaying a plurality of data items and receiving user commands, a method comprising:
    obtaining data identifying the first displayed data item;
    receiving, through the user interface, a command to swap the first displayed data item with a second displayed data item wherein the command to swap the first displayed data item with a second displayed data item is generated by the depression of one of function keys from the keyboard;
    receiving, through the user interface, a directional command identifying a relative direction of a position of the second displayed data item to a position of the first displayed data item wherein the directional command is generated by the depression of one of up, down, left, or right arrow keys from the keyboard; and
    swapping the first displayed data item with the second displayed data item if the first displayed data item and the second displayed data item have similar respective data types;
    wherein said depression of one of function keys and said depression of one of up, down, left, or right arrow keys at the same time cause said swapping.--

Line 23, delete claim 2 in its entirety and substitute the following in its place:
--2. A computer program product for use with a computer system having a keyboard and a user interface capable of displaying a plurality of data items and receiving user commands, the computer program product comprising a computer readable medium having embodied therein program code comprising:
    program code for obtaining data identifying a first displayed data item;
    program code for receiving, through the user interface, a command to swap the first displayed data item with a second displayed data item wherein the command to swap the first displayed data item with a second displayed data item is generated by the depression of one of function keys from the keyboard;
    program code for receiving, through the user interface, a directional command identifying a relative direction of a position of the second displayed data item to a position of the first displayed data item wherein the directional command is generated by the depression of one of up, down, left, or right arrow keys from the keyboard; and
    program code for swapping the first displayed data item with the second displayed data item if the first displayed data item and the second displayed data item have similar respective data types;
    wherein said depression of one of function keys and said depression of one of up, down, left, or right arrow keys at the same time cause said swapping.--

UNITED STATES PATENT AND TRADEMARK OFFICE
CERTIFICATE OF CORRECTION

PATENT NO. : 7,017,118 B1
APPLICATION NO. : 09/752337
DATED : March 21, 2006
INVENTOR(S) : Michael E. Carroll It is certified that error appears in the above-identified patent and that said Letters Patent is hereby corrected as shown below:

Column 12,
Line 12, delete claim 3 in its entirety, and substitute the following in its place:
--3. An apparatus for use with a computer system having a keyboard and a user interface capable of displaying a plurality of data items and receiving user commands, the apparatus comprising:
    program logic configured to obtain data identifying a first displayed data item;
    program logic configured to receive, through the user interface, a command to swap the first displayed data item with a second displayed data item wherein the command to swap the first displayed data item with a second displayed data item is generated by the depression of one of function keys from the keyboard;
    program logic configured to receive, through the user interface, a directional command identifying a relative direction of a position of the second displayed data item to a position of the first displayed data item wherein the directional command is generated by the depression of one of up, down, left, or right arrow keys from the keyboard; and
    program logic configured to swap the first displayed data item with the second displayed data item if the first displayed data item and the second displayed data item have similar respective data types;
    wherein said depression of one of function keys and said depression of one of up, down, left, or right arrow keys at the same time cause said swap.--

Signed and Sealed this

Twenty fourth Day of October, 2006

JON W. DUDAS
*Director of the United States Patent and Trademark Office*